(12) United States Patent
Kommrusch (10) Patent No.: US 6,795,882 B1
(45) Date of Patent: Sep. 21, 2004

(54) HIGH SPEED ASYNCHRONOUS BUS FOR AN INTEGRATED CIRCUIT

(75) Inventor: Steve Kommrusch, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 495 days.

(21) Appl. No.: 09/873,735

(22) Filed: Jun. 4, 2001

(51) Int. Cl.[7] .............................................. G06F 13/00
(52) U.S. Cl. ...................................... 710/100; 713/400
(58) Field of Search ............................... 710/305, 306, 710/315, 310, 100; 375/355, 356; 713/400, 600

(56) References Cited

U.S. PATENT DOCUMENTS

| | | | | |
|---|---|---|---|---|
| 5,357,613 A | * | 10/1994 | Cantrell et al. ............... | 710/61 |
| 5,388,225 A | * | 2/1995 | Cantrell et al. ............. | 710/306 |
| 5,442,658 A | * | 8/1995 | Cuny et al. ................. | 375/356 |
| 5,561,691 A | * | 10/1996 | Weinraub .................... | 375/355 |
| 6,128,758 A | * | 10/2000 | Hall et al. ................... | 714/727 |
| 6,286,072 B1 | * | 9/2001 | Bredin et al. ................ | 710/305 |

* cited by examiner

Primary Examiner—Glenn A. Auve (57) ABSTRACT

An apparatus for providing a high speed asynchronous bus for a plurality of modules of an integrated circuit is disclosed. Each of the modules may comprise one or more clock domains. The apparatus comprises a distributed AND structure capable of receiving a data strobe signal and a data signal from each of the plurality of modules. A method for sampling data from the high speed asynchronous bus is also disclosed. Data is sampled when a sampling criterion has occurred. The sampling criterion is based upon detecting changes in a data strobe signal or in a delayed data strobe signal.

19 Claims, 5 Drawing Sheets

HIGH SPEED ASYNCHRONOUS BUS FOR AN INTEGRATED CIRCUIT

FIELD OF THE INVENTION

The present invention relates to an apparatus and method for providing a high speed asynchronous bus for an integrated circuit. The high speed asynchronous bus of the present invention is capable of regulating the transfer of data from different clock domains of an integrated circuit.

BACKGROUND OF THE INVENTION

Large scale integrated circuits comprise many circuit elements. A large scale integrated circuit is sometimes referred to as a "microchip" or simply as a "chip." Large scale integrated circuits often contain a number of different areas or "modules" that relate to a specific function. A module (or a group of modules) in an integrated circuit may operate on a single clock frequency. An area of an integrated circuit that operates on a single clock frequency is referred to a "clock domain." In some cases a single module may contain two or more areas that operate on different clock frequencies. That it, a single module may contain multiple clock domains.

To regulate the transfer of data within an integrated circuit it is desirable to be able to obtain data from the different modules of the integrated circuit in an efficient manner.

SUMMARY OF THE INVENTION

The present invention is directed to an apparatus and method for providing a high speed asynchronous bus for transferring data from different clock domains of an integrated circuit.

The apparatus of the present invention comprises a high speed asynchronous data bus capable of receiving data from a plurality of modules of an integrated circuit. The high speed asynchronous data bus comprises a distributed AND structure capable of receiving a data strobe signal and a data signal from each of the plurality of modules of the integrated circuit. Each of the modules of the integrated circuit may comprise a single clock domain or may comprise multiple clock domains. The data strobe signal from each module is ANDed with each of the data strobe signals from the other modules. Similarly, the data signal from each module is ANDed with each of data signals from each of the other modules. The number of AND gates for the data strobe signals is equal to the number of AND gates for the data signals in order to minimize time delay between the data strobe signals and the data signals.

It is an object of the present invention to provide an improved apparatus and method for transferring data from different clock domains on an integrated circuit.

It is another object of the present invention to provide an improved apparatus and method for sampling data received on a high speed asynchronous bus.

It is a further object of the present invention to provide a set of improved algorithms for sampling data received on a high speed asynchronous bus.

The foregoing has outlined rather broadly the features and technical advantages of the present invention so that those skilled in the art may better understand the Detailed Description of the Invention that follows. Additional features and advantages of the invention will be described hereinafter that form the subject matter of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: The terms "include" and "comprise" and derivatives thereof, mean inclusion without limitation, the term "or" is inclusive, meaning "and/or"; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, to bound to or with, have, have a property of, or the like; and the term "controller," "processor," or "apparatus" means any device, system or part thereof that controls at least one operation. Such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document. Those of ordinary skill should understand that in many instances (if not in most instances), such definitions apply to prior, as well as future uses of such defined words and phrases.

BRIEF DESCRIPTION OF THE DRAWINGS

For a more complete understanding of the present invention, and the advantages thereof, reference is now made to the following descriptions taking in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged integrated circuit or system.

Figure 1:
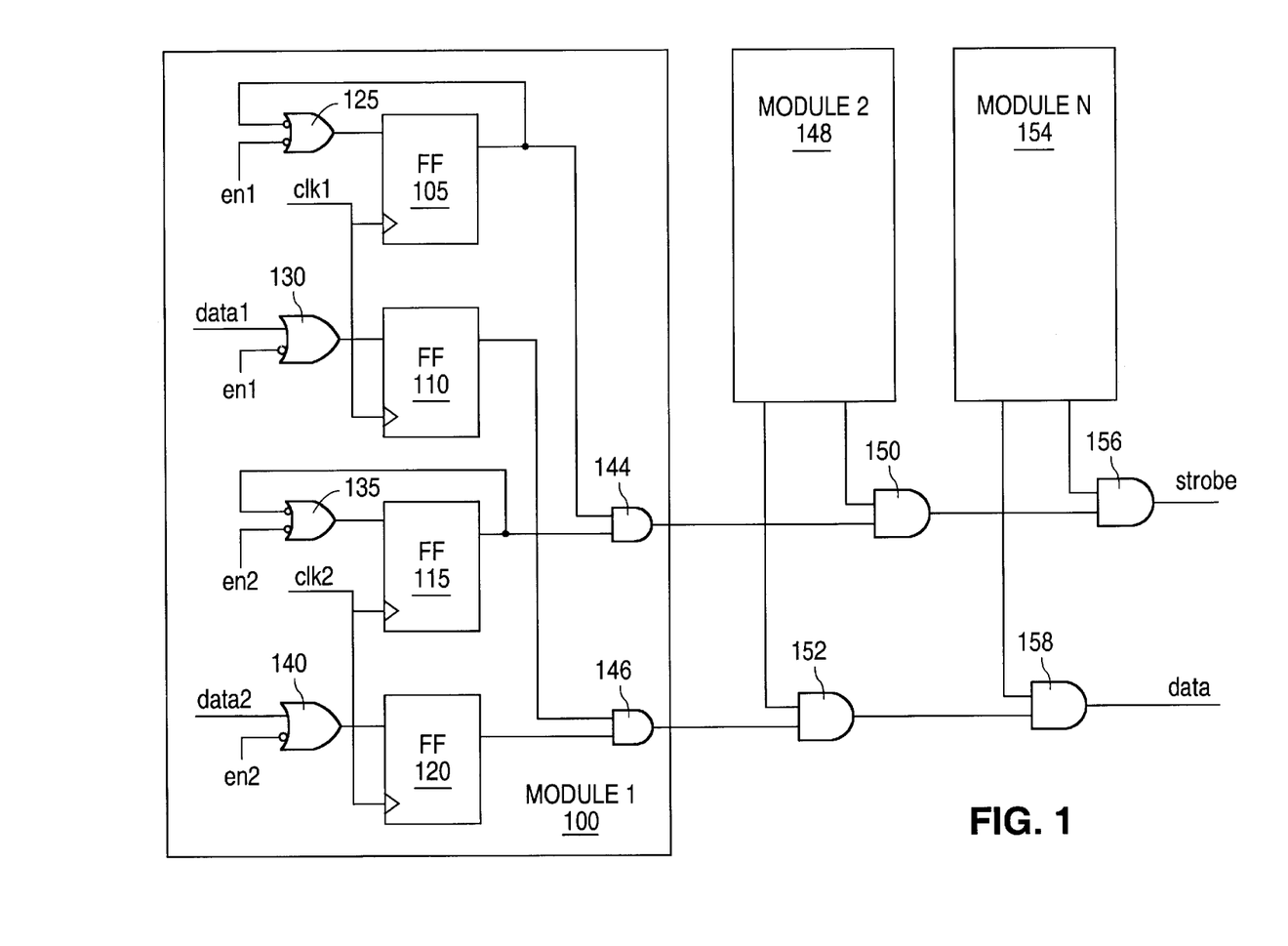
FIG. 1 schematically illustrates an exemplary first module of an integrated circuit comprising two clock domains and the connection of a strobe line and a data line from the first module to similar strobe lines and data lines of other modules through AND gates.

The present invention provides an apparatus and method for providing a high speed asynchronous bus (and bus protocol) for an integrated circuit. FIG. 1 illustrates three (3) exemplary modules of an integrated circuit (not shown). First module 100 may be referred to as "Module 1." Second module 148 may be referred to as "Module 2." Third module 154 may be referred to as "Module N." Although only three modules are shown in FIG. 1, the number three (3) is selected merely as an illustration. Any number N of modules may be used where N is an integer.

Module 100, module 148, and module 154 may each comprise a single clock domain or may each comprise multiple clock domains. A clock domain comprises a group of circuit elements that operates on a single clock frequency. For purposes of illustration, module 100 is shown having two clock domains.

The first clock domain of module 100 comprises flip flop 105 ("FF 105"), flip flop 110 ("FF 110"), OR gate 125 and OR gate 130. A first clock signal ("clk1") provides timing signals for the first clock domain of module 100. The second clock domain of module 100 comprises flip flop 115 ("FF 115"), flip flop 120 ("FF 120") OR gate 135 and OR gate 140. A second clock signal ("clk2") provides timing signals for the second clock domain of module 100.

The output of FF 105 is coupled to an input of AND gate 144 and to an inverter on an input of OR gate 125. The output of FF 110 is coupled to an input of AND gate 146. An enable signal for the first clock domain ("en1") of module 100 is provided to an inverter on an input of OR gate 125. The enable signal "en1" is also provided to an inverter on an input of OR gate 130. Data for FF 110 ("data1") is provided to an input of OR gate 130.

The output of FF 115 is coupled to an input of AND gate 144 and to an inverter on an input of OR gate 135. The output of FF 120 is coupled to an input of AND gate 146. An enable signal for the second clock domain ("en2") of module 100 is provided to an inverter on an input of OR gate 135. The enable signal "en2" is also provided to an inverter on an input of OR gate 140. Data for FF 120 ("data2") is provided to an input of OR gate 140.

The "en1" signal and the "en2" signal are active "high" signals. Therefore, an inactive "en1" signal (i.e., a "low" signal) drives a one ("1") into AND gate 144 and into AND gate 146. Similarly, an inactive "en2" signal (i.e., a "low" signal) drives a one ("1") into AND gate 144 and into AND gate 146.

The output of AND gate 144 of module 100 carries a strobe signal. The output of AND gate 146 of module 100 carries a data signal. Although the width of the data signal from module 100 is shown as one bit wide, the number one (1) is selected merely as an illustration. The data from module 100 may have any data width. For example, the data width from module 100 may be eight (8) bits wide or thirty two (32) bits wide. The data width from the other modules matches the data width of module 100.

Module 148 may comprise a single clock domain or may comprise multiple clock domains. If module 148 comprises multiple clock domains, then signals from the multiple clock domains are ANDed in a manner similar to that shown in module 100 to provide a strobe signal and a data signal for module 148. The strobe signal from module 148 is provided to an input of AND gate 150. The other input of AND gate 150 receives a strobe signal from AND gate 144. The data signal from module 148 is provided to an input of AND gate 152. The other input of AND gate 152 receives a data signal from AND gate 146.

Similarly, module 154 may comprise a single clock domain or may comprise multiple clock domains. If module 154 comprises multiple clock domains, then signals from the multiple clock domains are ANDed in a manner similar to that shown in module 100 to provide a strobe signal and a data signal for module 154. The strobe signal from module 154 is provided to an input of AND gate 156. The other input of AND gate 156 receives a strobe signal from AND gate 150. The data signal from module 154 is provided to an input of AND gate 158. The other input of AND gate 158 receives a data signal from AND gate 152.

AND gate 144, AND gate 150, and AND gate 156 comprise a distributed "strobe line" AND gate for obtaining a strobe signal representing the combination of module 100, module 148, and module 154. AND gate 146, AND gate 152, and AND gate 158 comprise a distributed "data line" AND gate for obtaining a data signal representing the combination of module 100, module 148, and module 154.

The protocol of the present invention requires that the strobe signal and the data signal each pass through the same number of gates. This feature minimizes the amount of skew that appears on the bus. The term "skew" refers to the time difference between the occurrence of a transition of a signal as seen at points relative to that occurrence at another point. In the illustrative example shown in FIG. 1, the strobe signal passes through three AND gates (AND gate 144, AND gate 150, and AND gate 156). The data signal also passes through three AND gates (AND gate 146, AND gate 152, and AND gate 158). The time delay of the strobe signal and the data signal will be the same because the strobe signal and the data signal each passed through the same number of AND gates.

Figure 2:
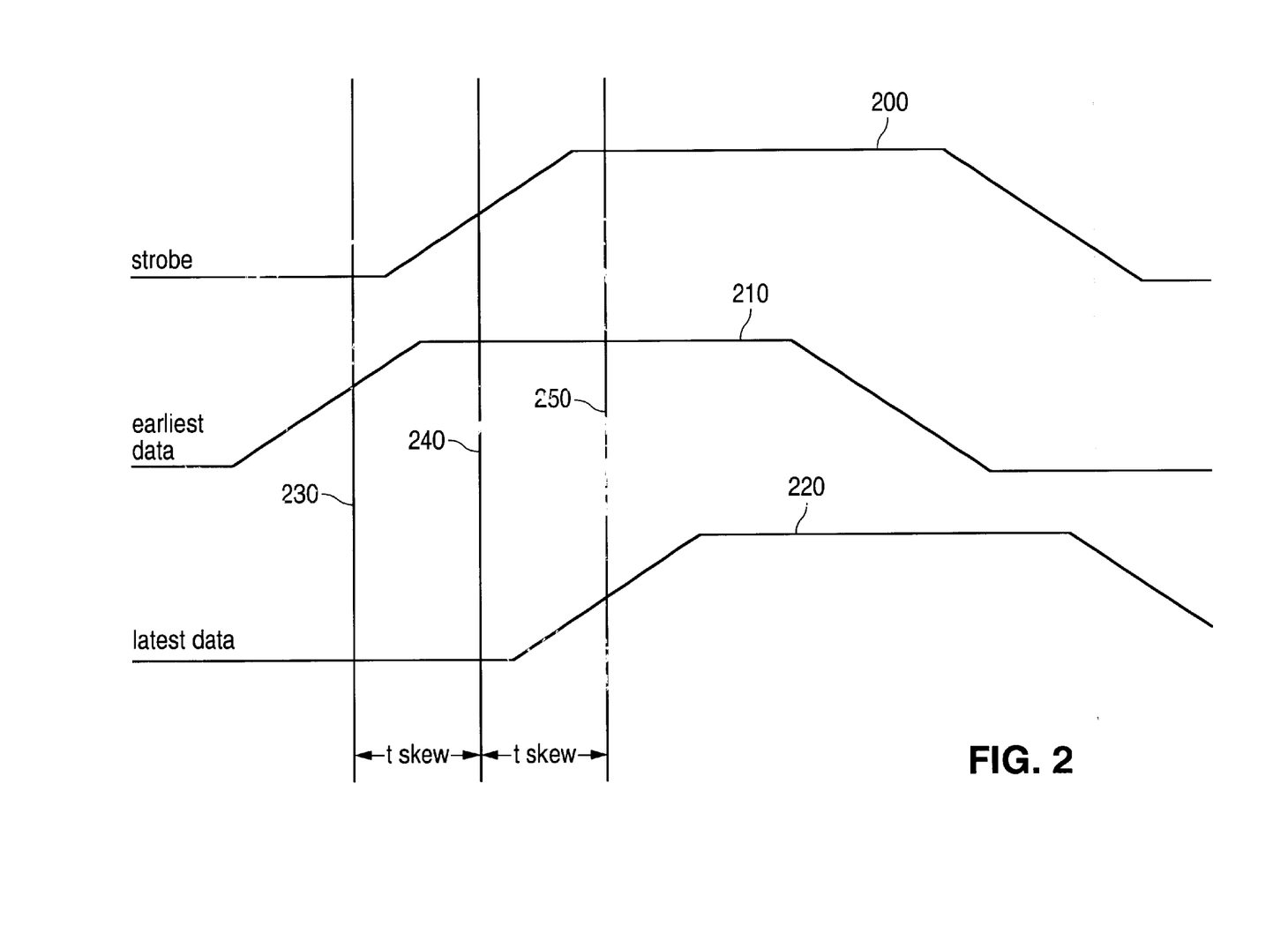
FIG. 2 schematically illustrates a timing diagram for a strobe signal, and a timing diagram for a data signal representing an early arrival of data, and a timing diagram for a data signal representing a late arrival of data.

FIG. 2 schematically illustrates a timing diagram for a strobe signal 200, and a timing diagram for a data signal 210 that represents an early arrival of data, and a timing diagram for a data signal 220 that represents a late arrival of data. The timing diagram of FIG. 2 shows two time intervals, each of which has a duration of "t skew." A maximum allowed value for "t skew" is determined by a value of the strobe delay permitted in a sampling circuit (not shown). The maximum delay (and therefore the maximum allowed skew) is one fourth (¼) of a sampling clock period.

The width of the time intervals labeled "t skew" in FIG. 2 has been enlarged (i.e., not drawn to scale) for the sake of clarity. When strobe signal 200 rises, the rising transition is completed within two "t skew" time intervals. The rising transition of strobe signal 200 begins within the first "t skew" time interval (i.e., between vertical line 230 and vertical line 240). The rising transition of strobe signal 200 is completed within the second "t skew" time interval (i.e., between vertical line 240 and vertical line 250).

Data signal 210 represents an arrival of the earliest data that may be detected. The rising transition of data signal 210 begins before the first "t skew" time interval (i.e., before vertical line 230). The rising transition of data signal 210 is completed within the first "t skew" time interval (i.e., between vertical line 230 and vertical line 240).

Similarly, data signal 220 represents an arrival of the latest data that may be detected. The rising transition of data signal 220 begins within the second "t skew" time interval (i.e., between vertical line 240 and vertical line 250). The rising transition of data signal 220 is completed after the second "t skew" time interval (i.e., after vertical line 250).

Figure 3:
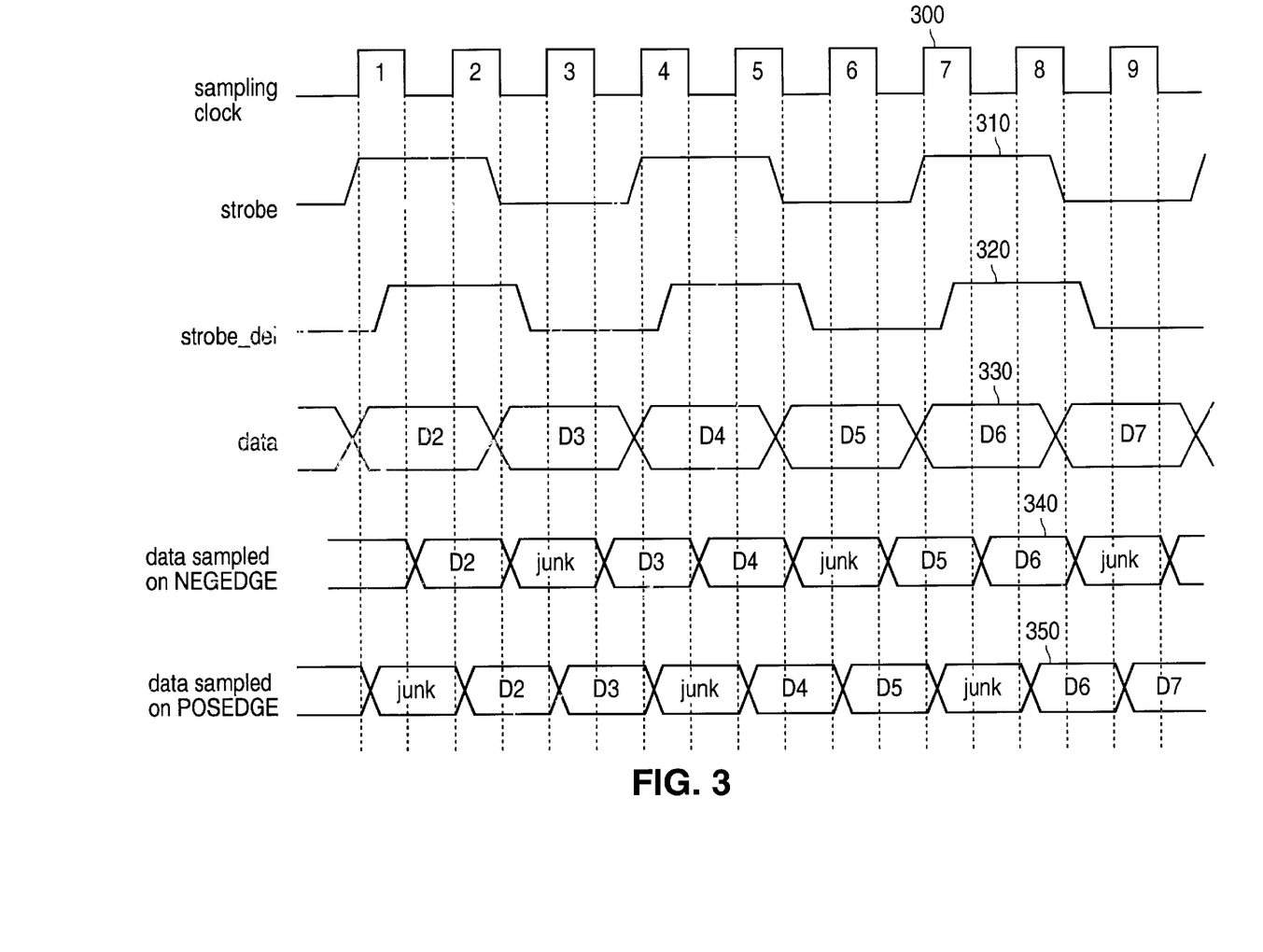
FIG. 3 schematically illustrates an exemplary timing diagram for a sampling clock signal, a strobe signal, a delayed strobe signal, a data signal clocked out at a period equal to approximately one and one half times the sampling clock period, a data signal for data sampled with a negative edge algorithm of the present invention, and a data signal for data sampled with a positive edge algorithm of the present invention.

FIG. 3 schematically illustrates an exemplary timing diagram for a sampling clock signal 300, for a strobe signal 310, for a delayed strobe signal 320, for a data signal 330 clocked out at a period equal to approximately one and one half times the sampling clock period, for a data signal 340 for data sampled with a negative edge algorithm, and for a data signal 350 for data sampled with a positive edge algorithm.

FIG. 3 shows sampling clock signal 300 in the form of regularly spaced square wave pulses. FIG. 3 also shows strobe signal 310 ("strobe") and a delayed strobe signal 320 ("strobe_del"). Delayed strobe signal 320 is delayed behind strobe signal 310 by a time that is larger that the time interval "t skew." The size of the delay is ideally one fourth (¼) of the sampling clock period to provide maximum margin on the sampling of the data. The delay must be larger than the data skew relative to the strobe ("t skew"). Therefore, the sampling clock cannot have a period that is less than four (4) times the time interval "t skew."

In FIG. 3, the data signal 330 is sampled (1) on the occurrence of a rising edge of the sampling clock signal and (2) on the occurrence of a falling edge of the sampling clock signal. In the case shown in FIG. 3 the incoming data is clocked out at a period approximately equal to one and one half times the sampling clock period. It is not necessary that the incoming data be clocked out at exactly one and one half times the sampling clock period because the reception of data is capable of handing asynchronous timing.

Data signal 340 shows data sampled with a negative edge algorithm of the present invention entitled NEGEDGE (for "negative edge"). The NEGEDGE sampling algorithm may be implemented using conventional logic circuitry (not shown) by a person of ordinary skill in logic circuitry design. The NEGEDGE algorithm states that if delayed strobe signal 320 changed during a previous high clock half period, then the sampled data recorded in signal 340 is data sampled during the occurrence of a negative edge (i.e., falling edge) of sampling clock signal 300. The data samples in data signal 340 that are labeled "junk" represent data samples for which uncertainty exists concerning the correct value for the data sample.

Data signal 350 shows data sampled with a positive edge algorithm of the present invention entitled POSEDGE (for "positive edge"). The POSEDGE sampling algorithm may be implemented using conventional logic circuitry (not shown) by a person of ordinary skill in logic circuitry design. The POSGEDGE algorithm states that if either (1) delayed strobe signal 320 changed during a previous first low clock half period, or if (2) strobe signal 310 changed in a previous half period, and delayed strobe signal 320 changed during a second low clock half period prior to the previous first low clock half period, then the sampled data recorded in signal 350 is data sampled during the occurrence of a positive edge (i.e., rising edge) of sampling clock signal 300. The data samples in data signal 350 that are labeled "junk" represent data samples for which uncertainty exists concerning the correct value for the data sample.

Figure 4:
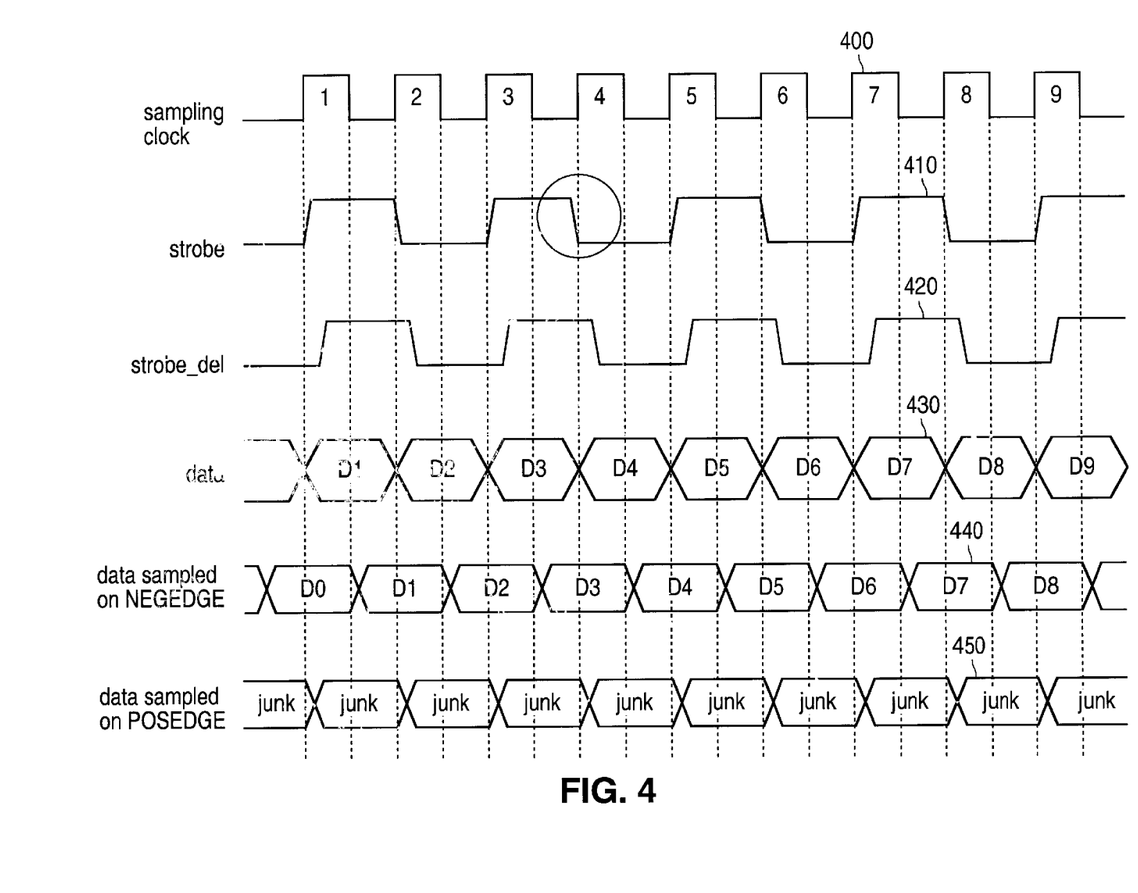
FIG. 4 schematically illustrates an exemplary timing diagram for a sampling clock signal, for a strobe signal, for a delayed strobe signal, for a data signal clocked out at a period approximately equal to the sampling clock period, for a data signal for data sampled with a negative edge algorithm of the present invention, and for a data signal for data sampled with a positive edge algorithm of the present invention.

FIG. 4 schematically illustrates an exemplary timing diagram for a sampling clock signal 400, for a strobe signal 410, for a delayed strobe signal 420, for a data signal 430 clocked out at a period approximately equal to the sampling clock period, for a data signal 440 for data sampled with the NEGEDGE algorithm, and for a data signal 450 for data sampled with the POSEDGE algorithm.

FIG. 4 shows sampling clock signal 400 in the form of regularly spaced square wave pulses. FIG. 4 also shows strobe signal 410 ("strobe") and a delayed strobe signal 420 ("strobe_del"). As in the case described with reference to FIG. 3, delayed strobe signal 420 is delayed behind strobe signal 410 by a time that is larger that the time interval "t skew."

In FIG. 4, the data signal 430 is sampled on the occurrence of a rising edge of the sampling clock signal. In the case shown in FIG. 4 the incoming data is clocked out at a period approximately equal to the sampling clock period.

Data signal 440 shows the result of sampling data in this case with the previously described NEGEDGE algorithm. In this case data signal 440 shows no "junk" readings (i.e., uncertain readings). Data signal 450 shows the result of sampling data in this case with the previously described POSEDGE algorithm. In this case all the data samples in data signal 450 are "junk" readings. As before, the term "junk" represents data samples for which uncertainty exists concerning the correct value for the data sample.

The falling edge of one strobe cycle of strobe signal 410 is shown circled in FIG. 4. The circled falling edge of the strobe signal was supposed to occur at the rising edge of cycle four (4) of the sampling clock signal. Due to noise in the system (e.g., clock jitter) the circled falling edge occurred before the rising of edge of cycle four (4) of the sampling clock signal.

This means that in the POSEDGE sampling algorithm the condition that "the strobe signal changed in a previous half period" is fulfilled. However, the condition that "the delayed strobe signal changed during a second low clock half period prior to the previous first low clock half period" is not fulfilled. Because both of these conditions have to be fulfilled, the POSEDGE sampling algorithm avoids sampling the "junk" signal. In this manner the POSEDGE sampling algorithm does not respond incorrectly if noise in the system creates a faulty strobe signal.

Figure 5:
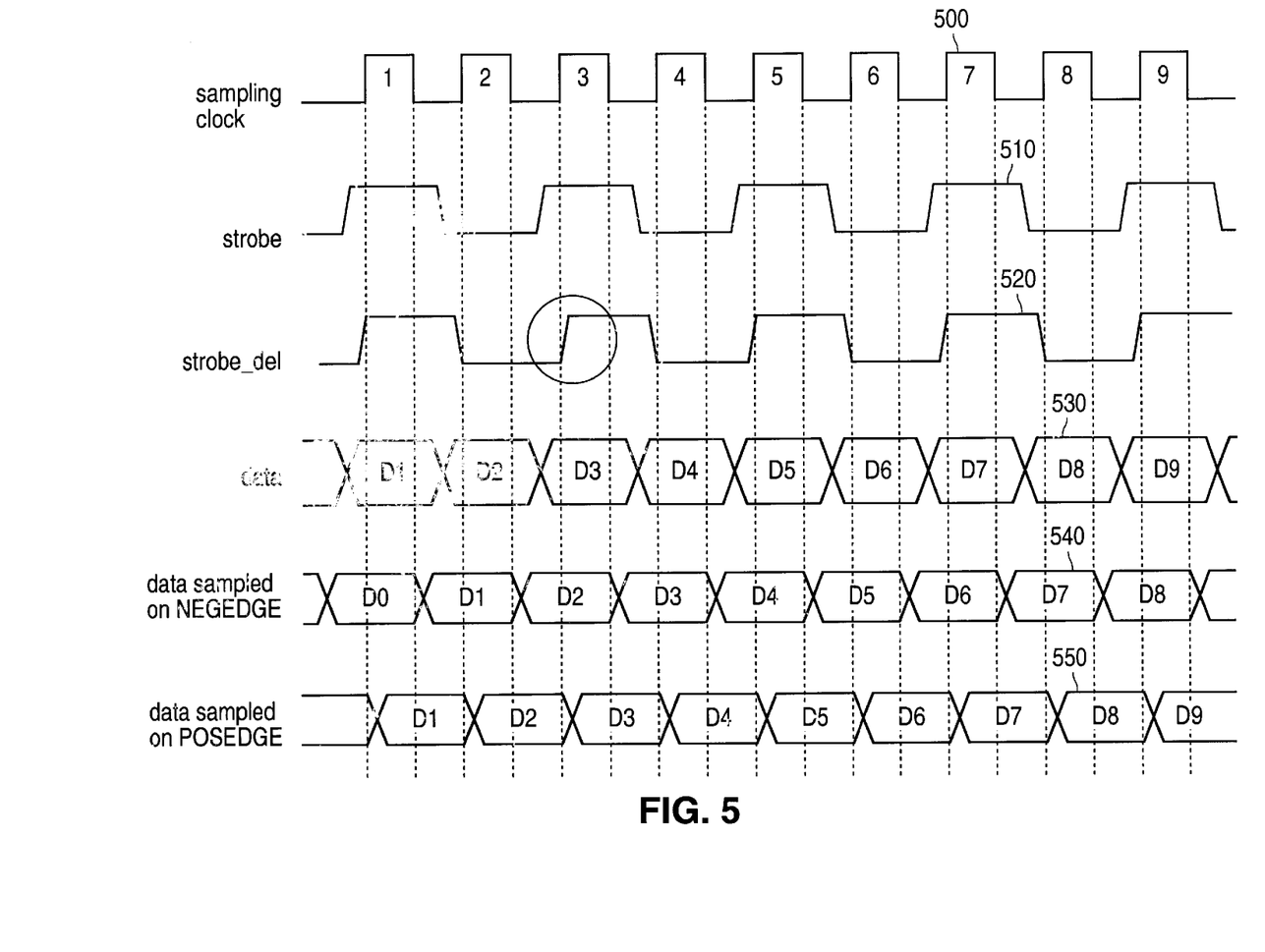
FIG. 5 schematically illustrates an exemplary timing diagram for a sampling clock signal, for a strobe signal, for a delayed strobe signal, for a data signal clocked out at a period approximately equal to the sampling clock period, for a data signal for data sampled with a negative edge algorithm of the present invention, and for a data signal for data sampled with a positive edge algorithm of the present invention.

FIG. 5 schematically illustrates an exemplary timing diagram for a sampling clock signal 500, for a strobe signal 510, for a delayed strobe signal 520, for a data signal 530 clocked out at a period approximately equal to the sampling clock period, for a data signal 540 for data sampled with the NEGEDGE algorithm, and for a data signal 550 for data sample d with the POSEDGE algorithm.

FIG. 5 shows sampling clock signal 500 in the form of regularly spaced square wave pulses. FIG. 5 also shows strobe signal 510 ("strobe") and a delayed strobe signal 520 ("strobe_del"). As in the case described with reference to FIG. 4, delayed strobe signal 520 is delayed behind strobe signal 510 by a time that is larger that the time interval "t skew."

In FIG. 5, the data signal 530 is sampled on the occurrence of a rising edge of the sampling clock signal. In the case shown in FIG. 5 the incoming data is clocked out at a period approximately equal to the sampling clock period.

Data signal 540 shows the result of sampling data in this case with the previously described NEGEDGE algorithm. In this case data signal 540 shows no "junk" readings (i.e., uncertain readings). Data signal 550 shows the result of sampling data in this case with the previously described POSEDGE algorithm. In this case data signal 550 also shows no "junk" readings. As before, the term "junk" represents data samples for which uncertainty exists concerning the correct value for the data sample.

The rising edge of one delayed strobe cycle of delayed strobe signal 520 is shown circled in FIG. 5. The circled rising edge of the delayed strobe signal was supposed to occur at the rising edge of cycle three (3) of the sampling clock signal. Due to noise in the system (e.g., clock jitter) the circled rising edge occurred after the rising of edge of cycle three (3) of the sampling clock signal.

This means that in the POSEDGE sampling algorithm the condition that "the strobe signal changed in a previous half period" is fulfilled. In addition, the condition that "the delayed strobe signal changed during a second low clock half period prior to the previous first low clock half period" is also fulfilled. Because both of these conditions are fulfilled, the POSEDGE sampling algorithm samples data during the occurrence of a positive edge (i.e., rising edge) of the sampling clock signal 500. In this manner the POSEDGE sampling algorithm does not respond incorrectly if noise in the system creates a faulty delayed strobe signal.

Although the present invention has been described in detail, those skilled in the art should understand that they can make various changes, substitutions and alterations herein without departing from the spirit and scope of the invention in its broadest form.

What is claimed is:

1. For use within an integrated circuit of a type comprising a plurality of modules wherein each module comprises at least one clock domain, an apparatus for providing an asynchronous bus for said plurality of modules, said apparatus comprising:

a data line comprising a first AND gate comprising a first input of said first AND gate is coupled to a module of said plurality of modules to receive a data signal from said module; and a strobe line comprising a second AND gate comprising a first input of said second AND gate is coupled to said module of said plurality of modules to receive a strobe signal from said module.

2. An apparatus as claimed in claim 1 wherein a second input of said first AND gate in said data line is coupled to a previous element of said data line receive a data signal from said previous element of said data line; and wherein a second input of said second AND gate is coupled to a previous element of said strobe line to receive a strobe signal from said previous element of said strobe line.

3. An apparatus as claimed in claim 2 wherein said previous element of said data line is an AND gate.

4. An apparatus as claimed in claim 2 wherein said previous element of said strobe line is an AND gate.

5. An apparatus as claimed in claim 2 wherein said previous element of said data line is a module of said plurality of modules.

6. An apparatus as claimed in claim 2 wherein said previous element of said strobe line is a module of said plurality of modules.

7. For use within an integrated circuit of a type comprising a plurality of modules wherein each module comprises at least one clock domain, an apparatus for providing an asynchronous bus for said plurality of modules, said apparatus comprising:

a data line comprising a plurality of data line AND gates in which a first input of each data line AND gate is coupled to a different corresponding module of said plurality of modules to receive a data signal from said module; and a strobe line comprising a plurality of strobe line AND gates in which a first input of each strobe line AND gate is coupled to a different corresponding module of said plurality of modules to receive a strobe signal from said module.

8. An apparatus as claimed in claim 7 wherein said plurality of data line AND gates and said plurality of strobe line AND gates are equal in number.

9. An apparatus as claimed in claim 7 wherein a second input of each data line AND gate is coupled to a previous element of said data line to receive a data signal from said previous element of said data line; and wherein a second input of each strobe line AND gate is coupled to a previous element of said strobe line to receive a strobe signal from said previous element of said strobe line.

10. An apparatus as claimed in claim 9 wherein said previous element of said data line is an AND gate.

11. An apparatus as claimed in claim 9 wherein said previous element of said strobe line is an AND gate.

12. The method as claimed in claim 11 wherein said sampling criterion comprises:

the change of a strobe signal during a previous half period of said sampling clock signal; and the change of a delayed strobe signal during a second low half period of said sampling clock signal prior to a previous first low half period of said sampling clock signal.

13. For use within an integrated circuit of a type comprising a plurality of modules wherein each module comprises at least one clock domain, a method for sampling data from an asynchronous bus coupled to said plurality of modules said method comprising:

receiving data from said asynchronous bus;

providing a sampling clock signal for sampling said data;

sampling said data from said asynchronous bus at a selected rate; and determining whether a sampling criterion has occurred; and upon the occurrence of said sampling criterion, further sampling said sampled data wherein said sampling criterion comprises the change of a delayed strobe signal during a previous high half period of said sampling clock signal.

14. The method as claimed in claim 13 wherein further sampling said sampled data occurs on the falling edge of said sampling clock signal.

15. The method as claimed in claim 14 wherein further sampling said sampled data occurs on the rising edge of said sampling clock signal.

16. The method as claimed in claim 15, wherein further sampling said sampled data occurs on the rising edge of said sampling clock signal.

17. For use within an integrated circuit of a type comprising a plurality of modules wherein each module comprises at least one clock domain, a method for sampling data from an asynchronous bus coupled to said plurality of modules, said method comprising:

receiving data from said asynchronous bus;

providing a sampling clock signal for sampling said data;

sampling said data from said asynchronous bus at a selected rate;

determining whether a sampling criterion has occurred; and upon the occurrence of said sampling criterion, further sampling said sampled data, wherein said sampling criterion comprises the change of a delayed strobe signal during a previous first low half period of said sampling clock signal.

18. For use within an integrated circuit of a type comprising a plurality of modules wherein each module comprises at least one clock domain, a method for sampling data from an asynchronous bus coupled to said plurality of modules, said method comprising:

receiving data from said asynchronous bus;

providing a sampling clock signal for sampling said data;

sampling said data from said asynchronous bus at a selected rate;

determining whether a sampling criterion has occurred;

upon the occurrence of said sampling criterion, further sampling said sampled data; and wherein said selected rate is approximately equal to one and one half times a clock period of said sampling clock signal.

19. For use within an integrated circuit of a type comprising a plurality of modules wherein each module comprises at least one clock domain, a method for sampling data from an asynchronous bus coupled to said plurality of modules, said method comprising:

receiving data from said asynchronous bus;

providing a sampling clock signal for sampling said data;

sampling said data from said asynchronous bus at a selected rate;

determining whether a sampling criterion has occurred;

upon the occurrence of said sampling criterion, further sampling said sampled data, wherein said sampling criterion comprises one of: (1) the change of a delayed strobe signal during a previous first low half period of said sampling clock signal, and (2) the change of a strobe signal during a previous half period of said sampling clock signal and the change of a delayed strobe signal during a second low half period of said sampling clock signal prior to the previous first low half period of said sampling clock signal.

* * * * *

UNITED STATES PATENT AND TRADEMARK OFFICE
CERTIFICATE OF CORRECTION

PATENT NO. : 6,795,882 B1
DATED : September 21, 2004
INVENTOR(S) : Kommrusch It is certified that error appears in the above-identified patent and that said Letters Patent is hereby corrected as shown below:

Column 7,
Line 46, please insert -- to -- after "data line" and before "receive a data."

Signed and Sealed this

Fourteenth Day of December, 2004

JON W. DUDAS
*Director of the United States Patent and Trademark Office*